United States Patent
Thompson et al.

(10) Patent No.: US 8,087,331 B2
(45) Date of Patent: Jan. 3, 2012

(54) METHOD OF MACHINING A CARRIER ASSEMBLY

(75) Inventors: Travis M. Thompson, Ann Arbor, MI (US); Stephen D. Doubler, Rochester Hills, MI (US); Jeffrey R. Lee, Tipton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 534 days.

(21) Appl. No.: 12/366,789

(22) Filed: Feb. 6, 2009

(65) Prior Publication Data

US 2010/0199817 A1    Aug. 12, 2010

(51) Int. Cl.
*B23B 3/00* (2006.01)
*G05B 19/401* (2006.01)
(52) U.S. Cl. .............................. 82/1.11; 82/118; 29/558
(58) Field of Classification Search ............... 82/1.11, 82/131, 117, 118, 901, 905; 29/558, 557; 409/131, 132, 165, 166
See application file for complete search history.

(56) References Cited

U.S. PATENT DOCUMENTS

| | | | | |
|---|---|---|---|---|
| 4,665,783 | A | * | 5/1987 | Romi ............................ 82/110 |
| 5,831,734 | A | * | 11/1998 | Van Tooren et al. .......... 356/620 |
| 7,156,718 | B2 | * | 1/2007 | Blasberg et al. ................ 451/5 |
| 7,441,484 | B1 | * | 10/2008 | Larsen et al. ................. 82/1.11 |
| 2005/0064794 | A1 | * | 3/2005 | Blasberg et al. ................ 451/5 |
| 2008/0298914 | A1 | * | 12/2008 | Nedzlek ....................... 408/158 |

\* cited by examiner

*Primary Examiner* — Will Fridie, Jr.

(57) ABSTRACT

A method for machining a surface on a workpiece having a member extending perpendicularly to the surface includes determining a position of a tool, determining a position of the workpiece, positioning at least one of the workpiece and the tool to a predefined position, rotating the workpiece, and rotating the tool to a predefined rotational speed. The predefined rotational speed synchronizes the rotation of the tool with the rotation of the workpiece in order to avoid unwanted contact between the tool and the member. The method includes the steps of translating at least one of the tool and the workpiece in a direction parallel to an axis defined by the workpiece, removing material from a first portion of the workpiece, translating at least one of the tool and the workpiece in a direction perpendicular to the axis of the workpiece, and removing material from a second portion of the workpiece.

19 Claims, 3 Drawing Sheets

METHOD OF MACHINING A CARRIER ASSEMBLY

FIELD

The invention relates generally to a method for machining a carrier assembly, and more particularly a method for machining a surface on a carrier spider of a carrier assembly using epicyclical machining.

BACKGROUND

The statements in this section merely provide background information related to the present disclosure and may or may not constitute prior art.

A typical carrier assembly used in planetary gear sets includes a spider carrier welded to a carrier flange or shell. A plurality of pinions and pinion washers are supported for rotation within the spider carrier. The carrier spider must have a machined surface in order to accurately locate the pinion washers. However, the typical spider assembly has a plurality of legs or members that extend out from the surface. These legs can interfere with the machining process as they can obstruct the movement of the machining tool.

One conventional method of machining the surface of a cast or forged spider carrier is to employ a traditional milling operation to produce a machined surface. However, this process requires multiple milling machines arranged in parallel to produce sufficient quantities to meet typical production volumes. An alternate solution is to make the spider carriers using net forging. However, net forged spider carriers may have a surface flatness that consumes about 70% to 80% of the total tolerance allowed in the finished welded carrier assembly. This can impede can make it difficult to meet the dimensional criteria for finished carrier assemblies.

Accordingly, there is room in the art for a method of machining a surface of a spider carrier that has improved dimensional control of the finished carrier assembly and which reduces the cycle time and lowers the capital investment compared to traditional milling.

SUMMARY

The present invention provides a method for machining a surface on a workpiece using a tool. The workpiece includes at least one member extending perpendicularly to the surface. The method comprises the steps of determining a position of the tool, determining a position of the workpiece, positioning at least one of the workpiece and the tool to a predefined position, rotating the workpiece, and rotating the tool to a predefined rotational speed. The predefined rotational speed synchronizes the rotation of the tool with the rotation of the workpiece in order to avoid unwanted contact between the tool and the member extending from the surface of the workpiece. The method also includes the steps of translating at least one of the tool and the workpiece in a direction parallel to an axis defined by the workpiece, removing material from a first portion of the surface of the workpiece, translating at least one of the tool and the workpiece in a direction perpendicular to the axis of the workpiece, and removing material from a second portion of the surface of the workpiece.

In one aspect of the present invention, the workpiece is a spider carrier of a carrier assembly used in a planetary gear set.

In another aspect of the present invention, the translation of the workpiece and the tool in directions parallel to the axis of the workpiece and perpendicular to the axis of the workpiece occur simultaneously.

In yet another aspect of the present invention, the rotational speed of at least one of the tool and the workpiece is changed and at least one of the workpiece and the tool are translated such that the tool removes material from a top of the member.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
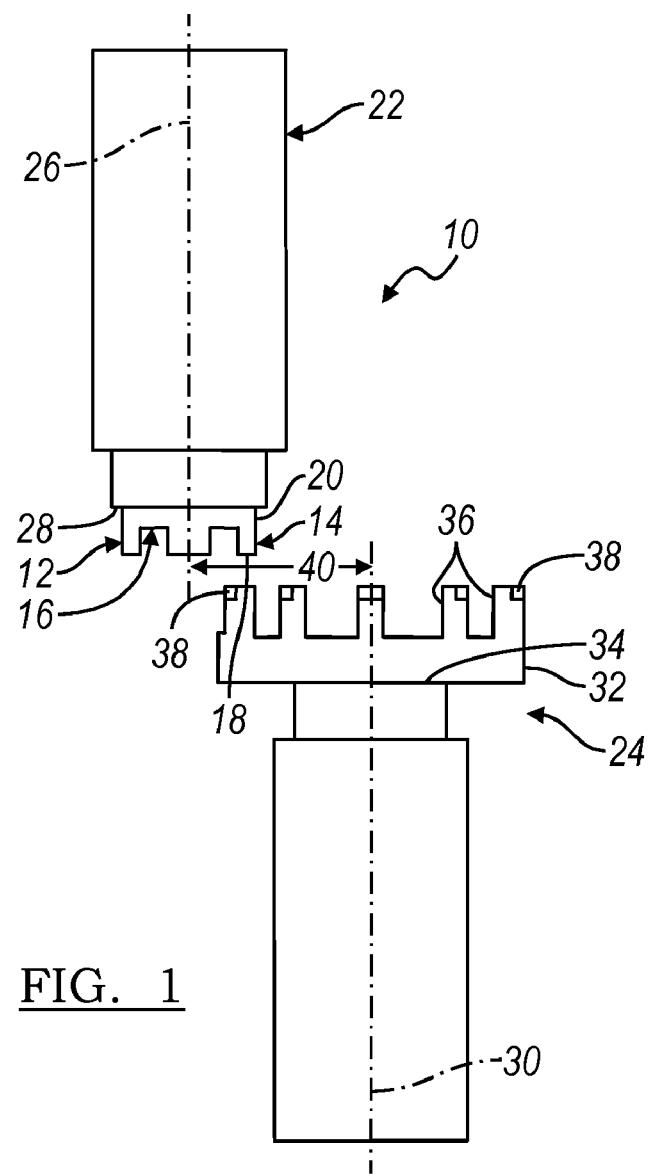
FIG. 1 is a diagrammatic side view of a system for machining a surface according to the principles of the present invention.
Figure 2:
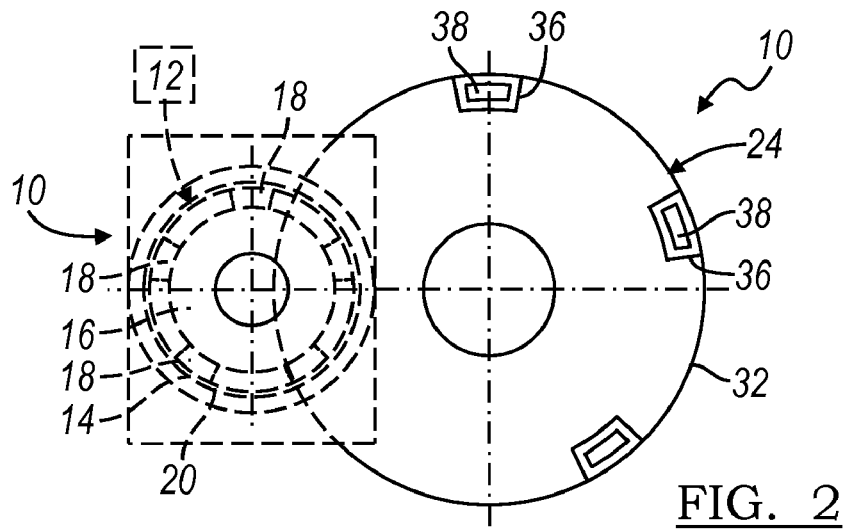
FIG. 2 is an enlarged, diagrammatic end view of the system for machining a surface according to the principles of the present invention.

With combined reference to FIGS. 1 and 2, a system for machining a surface is generally indicated by reference number 10. The system 10 is employed to machine or finish (i.e. remove material from) an exemplary workpiece 12, as will be described in greater detail below. The workpiece 12 generally includes an annular body 14 having a face or surface 16 and at least one extending member 18. The extending member 18 is located along an outer edge 20 of the annular body 14 and extends perpendicularly out from the surface 14. In the example provided, the workpiece 12 includes five extending members 18, however it should be appreciated that the workpiece 12 may have any number of extending members 18 without departing from the scope of the present invention. Moreover, in the example provided, the workpiece 12 is a spider carrier used in a carrier assembly of a planetary gear set. However, it should be appreciated that the system 10 may be employed with any workpiece 12 having a surface 16 that requires machining with at least one extending member 18.

The system 10 generally includes a workpiece spindle 22 and a tool spindle 24. The workpiece spindle 22 defines a workpiece longitudinal axis 26 and is operable to be rotated about the workpiece longitudinal axis 26 by a prime mover (not shown), such as an engine. The workpiece 12 is secured to an end 28 of the workpiece spindle 22 such that the workpiece 12 is centered along (i.e. concentric with) the workpiece longitudinal axis 26.

The tool spindle 24 defines a tool longitudinal axis 30 and is operable to be rotated about the tool longitudinal axis 30 by a prime mover (not shown), such as an engine. The tool spindle 24 includes a tool body 32 secured to an end 34 of the tool spindle 24. The tool body 32 is substantially shaped like a planar disc and includes at least one tool holder 36 extending perpendicularly out from the tool body 32 along an outer edge of the tool body 32. In the particular example provided, the tool body 32 includes five tool holders 36 spaced evenly along the outer diameter of the tool body 32. However, it should be appreciated that any number of tool holders 36 may be employed without departing from the scope of the present invention. The tool spindle 24 also includes at least one tool insert 38 secured or held by the tool holder 36. Again, while five tool inserts 38 are shown in the example provided, there may be any number of tool inserts 38 without departing from the scope of the present invention.

The workpiece spindle 22 and the tool spindle 24 are arranged with respect to one another such that the tool holders 36 and the tool inserts 38 face the surface 16 of the workpiece 12 that is secured to the workpiece spindle 22. Additionally, the workpiece spindle 22 and the tool spindle 24 are offset from one another such that the workpiece longitudinal axis 26 is parallel with the tool longitudinal axis 30 but the workpiece longitudinal axis 26 is spaced apart from the tool longitudinal axis 30 a first distance, indicated by reference number 40. In order to machine the surface 16 of the workpiece 12, either the workpiece spindle 22, the tool spindle 24, or both, are moved such that the distance between the workpiece 12 and the tool inserts 38 is adjusted and the distance between the axes 26, 30 is adjusted, as will be described in greater detail below.

Figure 3:
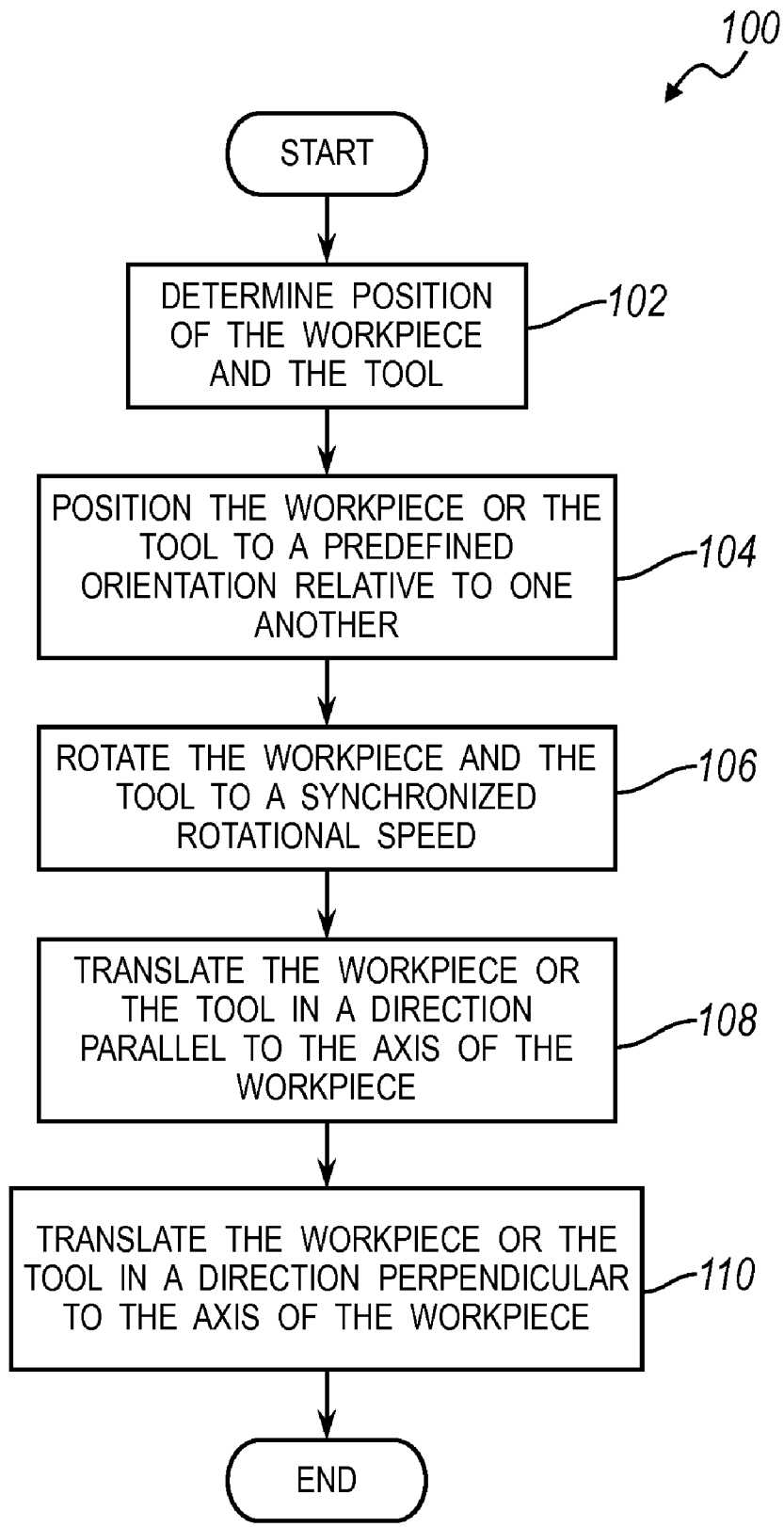
FIG. 3 is a flow chart of a method for machining a surface using the system illustrated in FIGS. 1 and 2 according to the principles of the present invention.

Turning now to FIG. 3, and with continued reference to FIGS. 1 and 2, a method for machining the surface 16 of the workpiece 12 is generally indicated by reference number 100. The method 100 may be controlled by a CNC controller or other electronic device. The method 100 begins at step 102 when the rotational and directional position of the workpiece 12 and workpiece spindle 22 relative to the tool inserts 38 and tool spindle 24 are determined. More specifically, the rotational orientation of the workpiece 12 and therefore the workpiece spindle 22 is determined relative to the tool inserts 38. Next, at step 104, either the workpiece spindle 22, the workpiece 12, and/or the tool spindle 24 are positioned (i.e. rotated) to a predetermined position relative to one another. This predetermined position corresponds to a known orientation between the tool inserts 38 and the workpiece 12 and provides a starting orientation. It should be appreciated that the step of positioning the workpiece spindle 22, the workpiece 12, and/or the spindle 24 may be performed automatically by a controller (not shown).

Next, the workpiece spindle 22 and the tool spindle 24 are each rotated to predetermined rotational speeds at step 108. The rotational speeds of each of the workpiece spindle 22 and the tool spindle 24 are synchronized by adjusting the rotational speeds so that they have a fixed rotational speed ratio relative to one another. The rotational speed ratio between the rotational speed of the workpiece spindle 22 and the rotational speed of the tool spindle 24 is calculated such that the tool inserts 38 pass between the extending members 18 on the workpiece 12 as the workpiece spindle 22 and the tool spindle 24 each rotate. Accordingly, the rotational speed ratio is determined from a number of factors including, but not limited to, the size of the workpiece 12, the location of the extending members 18 on the workpiece 12, and the location of the tool inserts 38.

Figure 4:
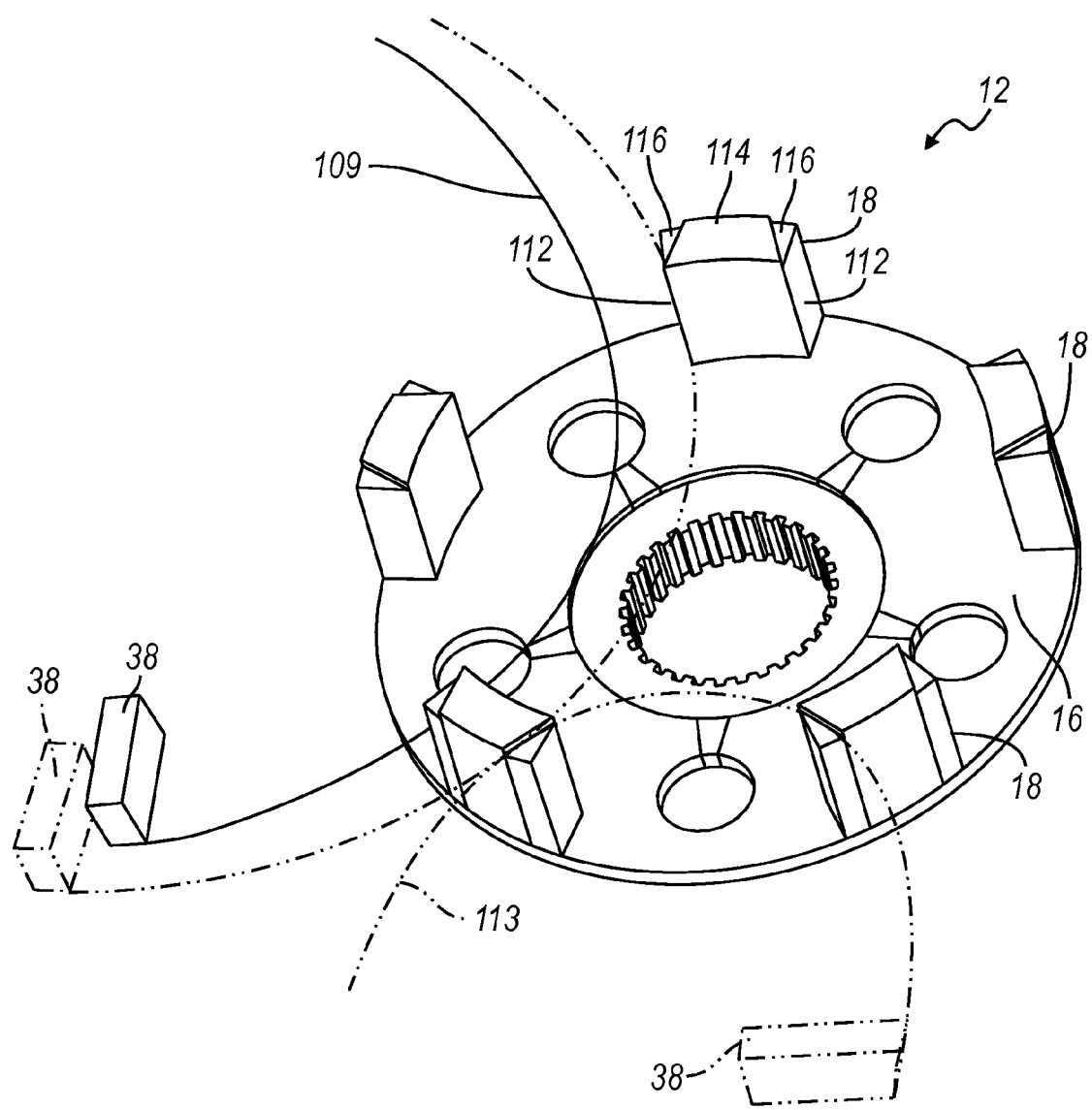
FIG. 4 is an enlarged, isometric view showing movement paths of a tool relative to a workpiece according to the principles of the present invention.

Next, the workpiece spindle 22 and the tool spindle 24 are moved relative to one another until the tool inserts 38 contact the face 16 of the workpiece 12. The distance the workpiece spindle 22 and the tool spindle 24 are moved towards each other is determined by the amount of material that is desired to be removed from the face 16 of the workpiece 12. As each of the workpiece 12 and the tool insert 38 rotate, the tool insert 38 sweeps across the face 16 and removes material from the workpiece 12. Turning to FIG. 4, an exemplary movement path of one of the tool inserts 38 is indicated by reference number 109. The movement path 109 is an epicyclical path. It should be appreciated that the tool spindle 24, as well as the workpiece spindle 24, are not illustrated in FIG. 4 in order to provide clarity. The tool insert 38 sweeps across the face 16 and passes between the extending members 18. The tool insert 38 is prevent from contacting the extending members 18 by maintaining the synchronization between the rotational speed of the workpiece spindle 22 and the rotational speed of the tool spindle 24.

Returning to FIG. 3, the method 100 continues at step 110 where the tool spindle 24 is translated relative to the workpiece spindle 22. However, it should be appreciated that the workpiece spindle 22 or both the workpiece spindle 22 and the tool spindle 24 may be translated without departing from the scope of the present invention. The tool spindle 24 is translated relative to the workpiece spindle 22 in a direction perpendicular to the axes 26 and 30. Accordingly, the distance 40 between the axes 26, 30 is varied as the tool spindle 24 is translated. In the example provided, the tool spindle 24 is translated towards the workpiece 12 such that the distance 40 decreases during step 110. As the tool spindle 24 is translated, the tool insert 38 contacts an area of the face 16 on the workpiece 12 that is different from the area of the face 16 contacted by the tool insert 38 prior to step 110. With reference to FIG. 4, an exemplary movement path of the tool insert 38 after the tool spindle 22 has been translated is indicated by reference number 111. The movement path 111 is an epicyclical path. The movement path 111 positions the tool insert 38 adjacent side walls 112 on each of the extending members 18 without contacting the side walls 112. Alternatively, the tool inserts 38 can contact the side walls 112 in order to finish the side walls 112 in a manner similar to the finish of the face 16. By translating the tool spindle 24 relative to the workpiece 12, the tool inserts 38 finish a larger area of the face 16. It should be appreciated that the method 100 may repeat steps 108 and 110 such that the tool spindle 24 is translated several times during the finish of the face 16 of the workpiece 12 and the tool spindle 24 may be positioned at various depths to provide various amounts of material removal from the workpiece 12. Moreover, the tool spindle 24 and workpiece 22 may be translated as in step 110 and plunged as in step 108 simultaneously to create angled surfaces on the face 16.

In an alternate embodiment, the method 100 can be employed to create features on the workpiece 12 by further varying the movement of the workpiece spindle 22 and the tool spindle 24. For example, by adjusting the distance the tool spindle 24 moves relative to the workpiece spindle 22, by adjusting the amount of translation, and by adjusting the synchronization ratio between the rotation of the workpiece spindle 22 and the tool spindle 24, the tool insert 38 can travel along a movement path 113 shown in FIG. 4 that removes material from a top surface 114 of the extending members 18. This removal of material from the top surface 114 creates shoulders 116 on the extending members 18. These shoulders 116 may be used during assembly of the spider and planet carrier assembly to act as a stop as the finished workpiece 12 is pressed into the flange (not shown) of the planet carrier assembly prior to welding in order to eliminate spacer blocks.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for machining a surface on a workpiece having at least one member extending perpendicularly to the surface, the method comprising:

determining a position of a tool determining a position of the workpiece;
positioning at least one of the workpiece and the tool to a predefined position;
rotating the workpiece;
rotating the tool to a predefined rotational speed wherein the predefined rotational speed synchronizes the rotation of the tool with the rotation of the workpiece;
translating at least one of the tool and the workpiece in a direction parallel to an axis defined by the workpiece;
removing material from a first portion of the surface of the workpiece;
translating at least one of the tool and the workpiece in a direction perpendicular to the axis of the workpiece; and
removing material from a second portion of the surface of the workpiece.

2. The method of claim 1 wherein the workpiece is rotated about the axis of the workpiece.

3. The method of claim 2 wherein the tool defines an axis, and the tool is rotated about the axis of the tool.

4. The method of claim 3 wherein the axis of the tool is parallel with the axis of the workpiece.

5. The method of claim 1 further comprising:
rotating the workpiece and the tool at a second predefined rotational speed wherein the second predefined rotational speed synchronizes the rotation of the tool with the rotation of the member of the workpiece;
translating at least one of the tool and the workpiece in the direction parallel to the axis defined by the workpiece; and
removing material from the member.

6. The method of claim 5 wherein the material is removed from a top of the member.

7. The method of claim 1 wherein the step of translating at least one of the tool and the workpiece relative to one another parallel to the axis of the workpiece and the step of translating at least one of the tool and the workpiece relative to one another perpendicular to the axis of the workpiece occur simultaneously.

8. The method of claim 1 wherein the first portion and the second portion are defined by an epicyclical movement path of the tool relative to the surface of the workpiece.

9. The method of claim 1 wherein removing material from the first portion includes removing material proximate a radial edge of the workpiece and wherein removing material from the second portion includes removing material proximate a center of the workpiece.

10. The method of claim 1 wherein the predefined rotation speed of the tool prevents the tool from undesirably removing material from the member of the workpiece during the step of translating at least one of the tool and the workpiece in a direction parallel to the axis defined by the workpiece and during the step of translating at least one of the tool and the workpiece in the direction perpendicular to the axis of the workpiece.

11. A method for machining a surface on a spider carrier, the spider carrier having a plurality of members extending perpendicularly to the surface, the method comprising:
determining a position of the spider carrier;
determining a rotational orientation of a tool relative to the position of the spider carrier;
rotating at least one of the spider carrier and the tool to a predefined rotational orientation;
rotating the spider carrier to a first rotational speed;
rotating the tool to a second rotational speed wherein the second rotational speed is maintained at a fixed ratio relative to the first rotational speed of the spider carrier;
translating at least one of the tool and the spider carrier towards one another in a direction parallel to an axis defined by the spider carrier;
removing material from a first portion of the surface of the spider carrier;
translating at least one of the tool and the spider carrier in a direction perpendicular to the axis of the spider carrier; and
removing material from a second portion of the surface of the spider carrier.

12. The method of claim 11 wherein the spider carrier is rotated about the axis of the spider carrier.

13. The method of claim 12 wherein the tool defines an axis, and the tool is rotated about the axis of the tool.

14. The method of claim 13 wherein the axis of the tool is parallel with the axis of the spider carrier.

15. The method of claim 11 further comprising:
rotating the spider carrier and the tool at a third predefined rotational speed wherein the third predefined rotational speed synchronizes the rotation of the tool with the rotation of the plurality of members of the spider carrier;
translating at least one of the tool and the spider carrier in the direction parallel to the axis defined by the spider carrier; and
removing material from the plurality of members.

16. The method of claim 15 wherein the material is removed from a top of each of the plurality of members.

17. The method of claim 11 wherein the step of translating at least one of the tool and the spider carrier relative to one another parallel to the axis of the spider carrier and the step of translating at least one of the tool and the spider carrier relative to one another perpendicular to the axis of the spider carrier occur simultaneously.

18. The method of claim 11 wherein the first portion and the second portion are defined by an epicyclical movement path of the tool relative to the surface of the spider carrier.

19. The method of claim 11 wherein removing material from the first portion includes removing material proximate a radial edge of the spider carrier between the plurality of members and wherein removing material from the second portion includes removing material proximate a center of the spider carrier.

* * * * *